United States Patent
Curet et al.

(10) Patent No.: US 12,393,737 B1
(45) Date of Patent: Aug. 19, 2025

(54) HARDWARE SECURITY MODULE ADAPTER SYSTEM, METHOD AND DEVICE WITH ACTIVE SWITCH

(71) Applicant: Marvell Asia Pte Ltd, Singapore (SG)

(72) Inventors: Jon Cameron Grant Curet, Costa Mesa, CA (US); Daniel Wong, San Gabriel, CA (US)

(73) Assignee: MARVELL ASIA PTE, LTD, Singapore (SG)

( * ) Notice: Subject to any disclaimer, the term of this patent is extended or adjusted under 35 U.S.C. 154(b) by 157 days.

(21) Appl. No.: 18/115,671

(22) Filed: Feb. 28, 2023

Related U.S. Application Data (60) Provisional application No. 63/440,658, filed on Jan. 23, 2023.

(51) Int. Cl.
*H05K 3/28* (2006.01)
*G06F 21/72* (2013.01)
*H05K 7/20* (2006.01)

(52) U.S. Cl.
CPC ............ *G06F 21/72* (2013.01); *H05K 3/284* (2013.01); *H05K 7/20409* (2013.01)

(58) Field of Classification Search
CPC ...... G06F 21/72; H05K 3/284; H05K 7/20409
See application file for complete search history.

(56) References Cited

U.S. PATENT DOCUMENTS

| | | | |
|---|---|---|---|
| 9,565,021 B1* | 2/2017 | Czaplewski | H04L 9/002 |
| 11,381,313 B2* | 7/2022 | Liang | H01S 5/021 |
| 2008/0251906 A1* | 10/2008 | Eaton | H01L 25/16 438/109 |
| 2017/0277913 A1* | 9/2017 | Berge | H04B 10/85 |
| 2018/0004980 A1* | 1/2018 | Kuczynski | G06F 21/72 |
| 2021/0136576 A1* | 5/2021 | Kinney | H04L 9/14 |
| 2021/0175973 A1* | 6/2021 | Liang | H01S 5/12 |
| 2021/0384989 A1* | 12/2021 | Nagarajan | H04B 10/503 |
| 2022/0418110 A1* | 12/2022 | Zhang | H05K 1/189 |
| 2023/0134349 A1* | 5/2023 | Masterson | G06F 21/88 713/193 |
| 2024/0089116 A1* | 3/2024 | Credico, Jr. | H04L 9/3247 |

* cited by examiner

*Primary Examiner* — J. Brant Murphy (57) ABSTRACT

A hardware security module system, method and device including one or more switches and a circuit board having pairs of security contact pads coupled with encryption/decryption and security components for determining if an unwanted physical access of the circuit board is occurring and disabling or erasing sensitive encryption/decryption data to prevent the unauthorized access of the data.

32 Claims, 8 Drawing Sheets

HARDWARE SECURITY MODULE ADAPTER SYSTEM, METHOD AND DEVICE WITH ACTIVE SWITCH

RELATED APPLICATIONS

This application claims priority under 35 U.S.C. § 119(e) of the U.S. provisional patent application Ser. No. 63/440,658, filed Jan. 23, 2023, and titled "LIQUID SECURITY 2—B0 HARDWARE SECURE MODULE (HSM) ADAPTER," which is hereby incorporated by reference.

FIELD OF INVENTION

The present invention relates to circuits including encryption/decryption components such as hardware security modules (HSM). More particularly, the present invention relates to adapters for enhancing security of circuits including encryption/decryption components.

BACKGROUND OF THE INVENTION

The security of data stored in electronic circuitry has become an important issue. Highly sensitive information such as encryption/decryption software keys (e.g. stored in encryption components), financial data, PIN numbers, passwords, and access codes are frequently the target of unauthorized access. One method used in attempting to access this data is the physical penetration of the printed circuit board assembly containing electronic components such as processors, logic circuits, or other circuits or components, as well as various memory devices used to store programs or data. Exposed address and data lines within the printed circuit board assembly may allow access to sensitive data. The penetration of the physical package may be brought about through chemicals, drilling, separation, etc. In addition, X-rays and other known techniques may allow non-destructive penetration into the physical package.

BRIEF SUMMARY OF THE INVENTION

A hardware security module system, method and device including one or more tamper responsive switches that press fit and thereby electrically coupled to security contact pads of a circuit board including the encryption/decryption component for determining if an unwanted physical access of the circuit board is occurring and disabling or erasing the hardware security module to prevent the unauthorized access of encryption data (e.g. encryption keys stored on the encryption/decryption component). Specifically, each switch is able to be sandwiched against the circuit board by a heat sink cover so as to electrically couple together two or more of the security contact pads thereby forming one or more complete security circuits. Each of these security circuits are then able to be monitored by a security component that detects if any of the switches are lifted (e.g. by detecting the loss of signal and/or voltage drop within the security circuit) and disabling or erasing encryption data to prevent the unauthorized access of encryption data.

A first aspect is directed to a hardware security module system. The system comprises a printed circuit board assembly including a printed circuit board and an encryption/decryption component for encrypting/decrypting data, a security component, at least one pair of security contact pads and a central processing unit (CPU) all positioned on a first board side of the printed circuit board, the security component electrically coupled with the pair of security contact pads, a rigid heat sink cover having a body, a plurality of heat dissipating fins, a plurality of coupling members and at least one support member, the plurality of heat dissipating fins extending from a first cover side of the body and the coupling members and the support member extending from a second cover side of the body opposite the first cover side, the coupling members are coupled to the first board side of the printed circuit board assembly and at least one switch including a non-electrically conductive body having support cavity accessible from a first end of the body, a conductive puck extending from a second end of the body opposite the first end and a protective flange extending from the second end and surrounding a perimeter of the conductive puck, wherein the support member is positioned within the support cavity of the switch such that the switch is compressed between the second cover side of the rigid heat sink cover and the pair of security contact pads on the first board side of the printed circuit board and the conductive puck is pressed against the pair of security contact pads thereby electrically coupling the pair of security contact pads together.

In some embodiments, a length of the switch the from the first end to an outermost edge of the flange is greater than a length of the support pillars. In some embodiments, the flange forms a chamber surrounding the conductive puck. In some embodiments, the system further comprises upper potting positioned between the second cover side of the heat dissipating plate and the top of the printed circuit board thereby encasing the encryption/decryption component, the security component, the pair of security contact pads and the CPU. In some embodiments, the flange forms a seal with the top of the printed circuit board thereby keeping the upper potting out of the chamber such that the upper potting does not contact the conductive puck. In some embodiments, the security component transmits electrical signals through and receives return electric signals from the conductive puck via the pair of security contact pads. In some embodiments, the security component deletes encryption keys maintained by the encryption/decryption component when the return electrical signals deviate from predetermined values. In some embodiments, the support member is positioned adjacent to one of the coupling members. In some embodiments, the switch is elastic such that the switch is able to be compressed between the heat dissipating plate and the printed circuit board without breaking. In some embodiments, the conductive puck is made of conductive rubber and the non-electrically conductive body is made of silicone. In some embodiments, the printed circuit board further comprises a microcontroller unit (MCU) and both the security component and the encryption/decryption component are a part of the MCU.

A second aspect is directed to a method of implementing a hardware security module system. The method comprises providing a printed circuit board assembly including a printed circuit board and an encryption/decryption component for encrypting/decrypting data, a security component, at least one pair of security contact pads and a central processing unit (CPU) all positioned on a first board side of the printed circuit board, the security component electrically coupled with the pair of security contact pads, coupling at least one switch to at least one support member of a rigid heat sink cover by sliding the support member into a support cavity of the switch, the rigid heat sink cover having a body, a plurality of heat dissipating fins, a plurality of coupling members and the at least one support member, the plurality of heat dissipating fins extending from a first cover side of the body and the coupling members and the support member extending from a second cover side of the body opposite the first cover side, wherein the at least one switch includes a non-electrically conductive body having the support cavity accessible from a first end of the body, a conductive puck extending from a second end of the body opposite the first end and a protective flange extending from the second end and surrounding a perimeter of the conductive puck and coupling the coupling members of the rigid heat sink cover to the first board side of the printed circuit board assembly such that the switch is compressed between the second cover side of the rigid heat sink cover and the pair of security contact pads on the first board side of the printed circuit board and the conductive puck is pressed against the pair of security contact pads thereby electrically coupling the pair of security contact pads together.

In some embodiments, a length of the switch the from the first end to an outermost edge of the flange is greater than a length of the support pillars. In some embodiments, the flange forms a chamber surrounding the conductive puck. In some embodiments, the method further comprises depositing upper potting between the second cover side of the heat dissipating plate and the top of the printed circuit board thereby encasing the encryption/decryption component, the security component, the pair of security contact pads and the CPU. In some embodiments, the flange forms a seal with the top of the printed circuit board thereby keeping the upper potting out of the chamber such that the upper potting does not contact the conductive puck. In some embodiments, the method further comprises with the security component, transmitting electrical signals through and receiving return electric signals from the conductive puck via the pair of security contact pads. In some embodiments, the method further comprises, with the security component, deleting encryption keys maintained by the encryption/decryption component when the return electrical signals deviate from predetermined values. In some embodiments, the support member is positioned adjacent to one of the coupling members. In some embodiments, the switch is elastic such that the switch is able to be compressed between the heat dissipating plate and the printed circuit board without breaking. In some embodiments, the conductive puck is made of conductive rubber and the non-electrically conductive body is made of silicone. In some embodiments, the printed circuit board further comprises a microcontroller unit (MCU) and both the security component and the encryption/decryption component are a part of the MCU.

A third aspect is directed to a hardware security module adapter. The adapter comprises a printed circuit board including an encryption/decryption component for encrypting/decrypting data, a security component, at least one pair of security contact pads and a central processing unit (CPU) all positioned on a first board side of the printed circuit board, the security component electrically coupled with the pair of security contact pads and at least one switch including a non-electrically conductive body having support cavity accessible from a first end of the body, a conductive puck extending from a second end of the body opposite the first end and a protective flange extending from the second end and surrounding a perimeter of the conductive puck, wherein the switch is compressed against the pair of security contact pads on the first board side of the printed circuit board thereby electrically coupling the pair of security contact pads together.

In some embodiments, the flange forms a chamber surrounding the conductive puck. In some embodiments, the adapter further comprises upper potting positioned on the top of the printed circuit board thereby encasing the encryption/decryption component, the security component, the pair of security contact pads and the CPU. In some embodiments, the flange forms a seal with the top of the printed circuit board thereby keeping the upper potting out of the chamber such that the upper potting does not contact the conductive puck. In some embodiments, the security component transmits electrical signals through and receives return electric signals from the conductive puck via the pair of security contact pads. In some embodiments, the security component deletes encryption keys maintained by the encryption/decryption component when the return electrical signals deviate from predetermined values. In some embodiments, the switch is elastic such that the switch is able to be compressed against the printed circuit board without breaking. In some embodiments, the conductive puck is made of conductive rubber and the non-electrically conductive body is made of silicone. In some embodiments, the printed circuit board further comprises a microcontroller unit (MCU) and both the security component and the encryption/decryption component are a part of the MCU.

A fourth aspect is directed to a security module system. The system comprises a printed circuit board assembly including a printed circuit board and means for encrypting/decrypting data, means for securing the means for encrypting/decrypting data, means for processing data and means for electrically coupling with the means for securing all positioned on a first board side of the printed circuit board, the means for securing electrically coupled with the means for electrically coupling, a rigid heat sink cover having a body, means for dissipating heat, means for coupling to the printed circuit board and means for supporting a switch, the means for dissipating heat extending from a first cover side of the body and the means for coupling and the means for supporting extending from a second cover side of the body opposite the first cover side, wherein the means for coupling are coupled to the first board side of the printed circuit board assembly and at least one switch including a non-electrically conductive body having support cavity accessible from a first end of the body, means for completing an electrical circuit extending from a second end of the body opposite the first end and means for protecting the means for completing extending from the second end and surrounding a perimeter of the means for completing, wherein the means for supporting is positioned within the support cavity of the switch such that the switch is compressed between the second cover side of the rigid heat sink cover and the means for electrically coupling on the first board side of the printed circuit board and the means for completing is pressed against the means for electrically coupling thereby electrically coupling the means for electrically coupling together.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments are directed to a hardware security module system, method and device including one or more tamper responsive switches that press fit and thereby electrically coupled to security contact pads of a circuit board including the encryption/decryption component for determining if an unwanted physical access of the circuit board is occurring and disabling or erasing the hardware security module to prevent the unauthorized access of encryption data (e.g. encryption keys stored on the encryption/decryption component). Specifically, each switch is able to be sandwiched against the circuit board by a heat sink cover so as to electrically couple together two or more of the security contact pads thereby forming one or more complete security circuits. Each of these security circuits are then able to be monitored by a security component that detects if any of the switches are lifted (e.g. by detecting the loss of signal and/or voltage drop within the security circuit) and disabling or erasing encryption data to prevent the unauthorized access of encryption data. As a result, the system, method and device provide the advantage of preventing an attacker from accessing encryption data by physically accessing the encryption/decryption component. In particular, if an attacker were trying to unscrew or other wise lift the heat sink and/or switches in order to access the components of the circuit board assembly, the switches would spring away from the security contact pads (e.g. upon release of the pressure coupling the switch to the contact pads provided by the heat sink) thereby alerting the security component of the intrusion (where the security signal is lost and the encryption data is able to be zeroized before it can be accessed).

FIGS. 1A-E illustrate a top perspective view, a bottom perspective view, a right side view, a left side view and an exploded top perspective view of a hardware security module system 100, respectively, according to some embodiments. As shown in FIGS. 1A-E, the hardware security module system 100 comprises a printed circuit board (or printed circuit board assembly) 102, a top (or first) side potting 104a, a bottom (or second) side potting 104b, a heat sink cover 106, one or more tamper responsive switches 108, one or more thermal gap pads 110 and one or more fasteners 112 (e.g. screws). Alternatively, one or more of the top side potting 104a, the bottom side potting 104b, the heat sink cover 106, the one or more tamper responsive switches 108, the one or more thermal gap pads 110 and the one or more fasteners 112 are able to be omitted. Although as shown in FIGS. 1A-E the system 100 comprises two tamper responsive switches 108, five thermal gap pads 110 and eight fasteners 112, the system is able to comprise more or less tamper responsive switches 108, thermal gap pads 110 and fasteners 112. The bottom potting 104a and the thermal gap pads 110 are omitted from FIGS. 1C and 1D to better illustrate the tamper responsive switches 108 between the heat sink cover 106 and the printed circuit board 102.

The heat sink cover 106 is physically coupled to a top (or first) side of the printed circuit board 102 by the fasteners 112 sandwiching the tamper responsive switches 108 and the thermal gap pads 110 between a bottom side of the heat sink cover 106 and the top side of the printed circuit board 102 (and/or components thereof). In particular, as described in detail below, the tamper responsive switches 108 are able to slide onto support posts 306 extending from the bottom of the heat sink cover 106 and electrically couple together two or more security contact pads 204 on the top side of the printed circuit board 102 due to being pressed against the top of the contact pads 204 by the heat sink cover 106. In some embodiments, the tamper responsive switches 108 (and the support posts 306 that they slide onto) are each positioned adjacent to one of the coupling pillars 308. As a result, the strength of the force producing the compression, contact and/or electrical coupling between each of the tamper responsive switches 108 and the security contact pads 204 is able to be better controlled by tightening or loosening the engagement of the fastener 112 with the coupling pillar 308 adjacent to that switch 108. Further, by being positioned adjacent to coupling pillars 308, the coupling pillars 308 are able to protect the switches 108 from being over-compressed by providing rigid structure that resists further compression against the circuit board 102 once the pillars 308 contact the surface of the top of the printed circuit board 102. Alternatively, one or more of the tamper responsive switches 108 (and the corresponding support posts 306) are able to be positioned elsewhere on the circuit board 102 (and heat sink cover 106) non-adjacent to one of the coupling pillars 308.

The thermal gap pads 110 are able to be made from silicone polymer that is combined with a thermal medium (e.g. ceramic). Alternatively, one or more of the gap pads 110 are able to be made of other heat conductive materials. The thermal gap pads 110 are able to be positioned between the tops of one or more of the components of the printed circuit board 102 (e.g. the tops of the CPU 206, the security component 208, the memory 210, and/or the encryption/decryption component 212, power supply, integrated circuit/microchip or other components) and the bottom of the heat sink cover 106. In particular, when the heat sink cover 106 is fully coupled to the circuit board 102, the thermal gap pads 110 are able to be in physical contact with both the tops of the one or more of the components of the printed circuit board 102 and the bottom of the heat sink cover 106 in order to facilitate the transfer of heat generated by the components to the heat sink cover 106. Accordingly, a shape of each of the thermal gap pads 110 is able to conform with a shape of the top of the component on the circuit board 102 whose top they contact.

The fasteners 112 are able to extend from the bottom of the printed circuit board 102 through holes within the printed circuit board 102 and engage with coupling pillars 308 (e.g. thread into threaded shafts 310 of the pillars 308) extending from the bottom of the heat sink cover 106 (e.g. be threaded into internal threading of the coupling pillars 308). Thus, as the fasteners 112 further engage with the coupling pillars, the bottom of the heat sink cover 106 is pulled against the top of the circuit board 102 until the bottom of the coupling pillars 308 contacts the top of the circuit board 102. As described below, this causes the outermost edge 410 of the flange 404 of the switches 108 to contact the top of the printed circuit board 102 and as the heat sink cover 106 is further pulled against the top of the circuit board 102, the heat sink cover 106 compresses the switches 108 (e.g. causing the flange 202 to flex or bend) such that their conductive puck 406 contacts the top of the circuit board 102 (and the security contact pads 204). Conversely, if the pulling force is removed, the switches 108 are able to elastically spring the conductive puck 406 away from the top of the board 102 (e.g. as the flange 404 unflexes and springs back to its full length).

The top and bottom potting 104a, 104b are able to be hard opaque epoxy. Alternatively, the top and bottom potting 104a, 104b are able to be thermosetting plastics, silicone rubber gels and/or other types of epoxy resins. The top potting 104a is able to fill any empty space between the bottom of the heat sink cover 106 and the top of the printed circuit board 102 (for the top potting 104a) and the bottom potting 104b is able to cover most or all of a bottom (or second) side of the printed circuit board 102 (for the bottom potting 104b). As a result, the top potting 104a is able to include apertures for the switches 108 and coupling pillars 308 while also protecting access to the area and components (e.g. encryption/decryption component 212, security component 208, central processing unit 206 and/or other components) located in the space between the bottom of the heat sink cover 106 and the top of the printed circuit board 102. The flanges 404 of the tamper responsive switches 108, when pressed against the top of the circuit board 102 create a protected flange chamber 412 that keeps the top potting 104a out and thereby prevents the top potting 104a from contacting the conductive puck 406. Further, the bottom potting 104b is able to cover the tops of the fasteners 112 such that in order to disengage the fasteners 112 from the coupling pillars 308, an attacker would need to first remove the portion of the bottom potting 104b covering the fasteners 112.

Figure 1A:
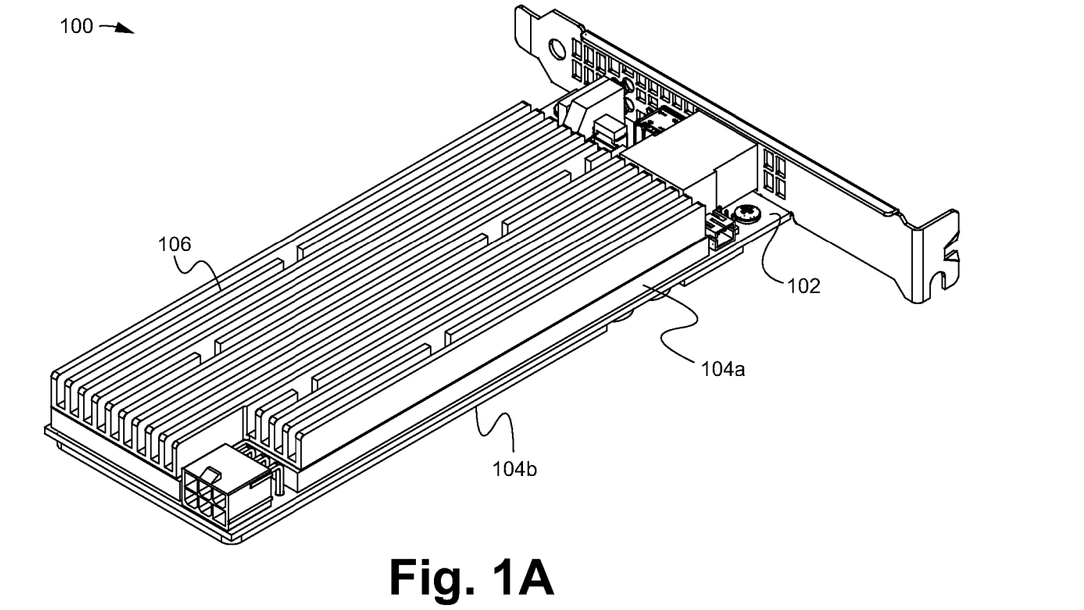
FIG. 1A illustrates a top perspective view of a hardware security module system according to some embodiments.
Figure 1B:
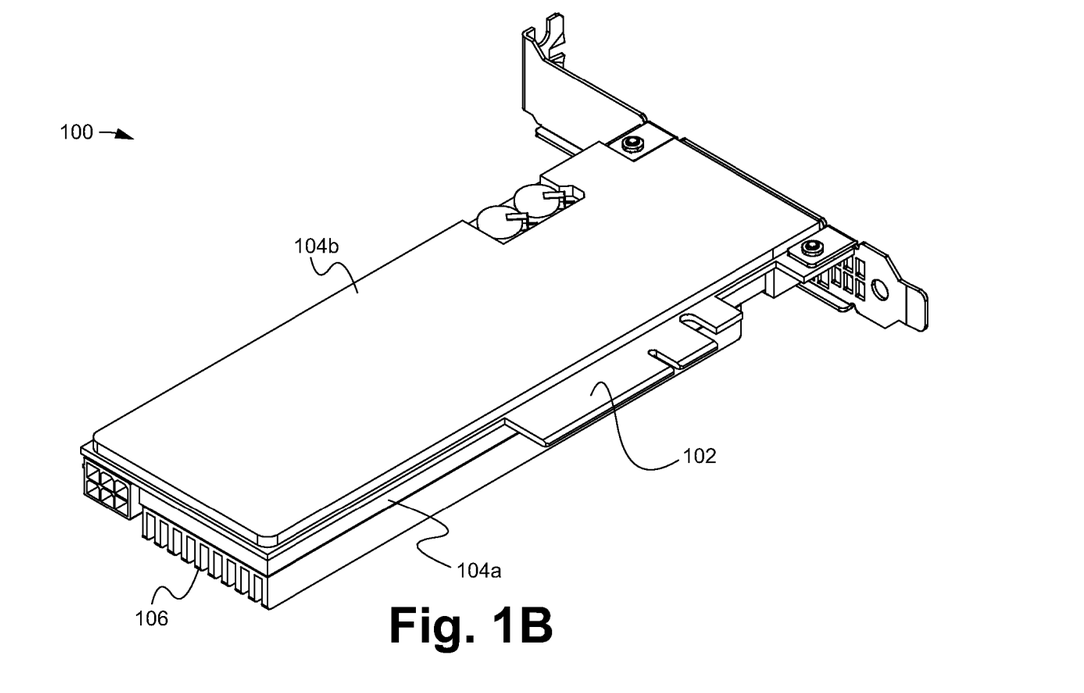
FIG. 1B illustrates a bottom perspective view of a hardware security module system according to some embodiments.
Figure 1C:
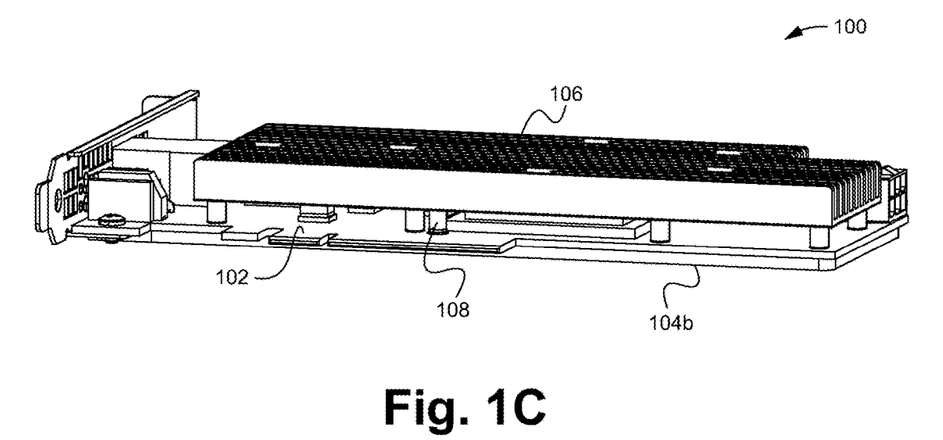
FIG. 1C illustrates a right side view of a hardware security module system according to some embodiments.
Figure 1D:
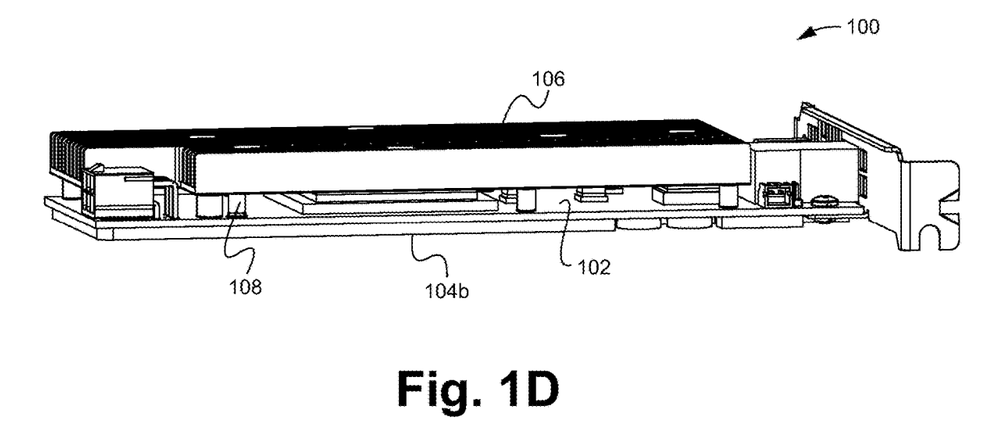
FIG. 1D illustrates a left side view of a hardware security module system according to some embodiments.
Figure 1E:
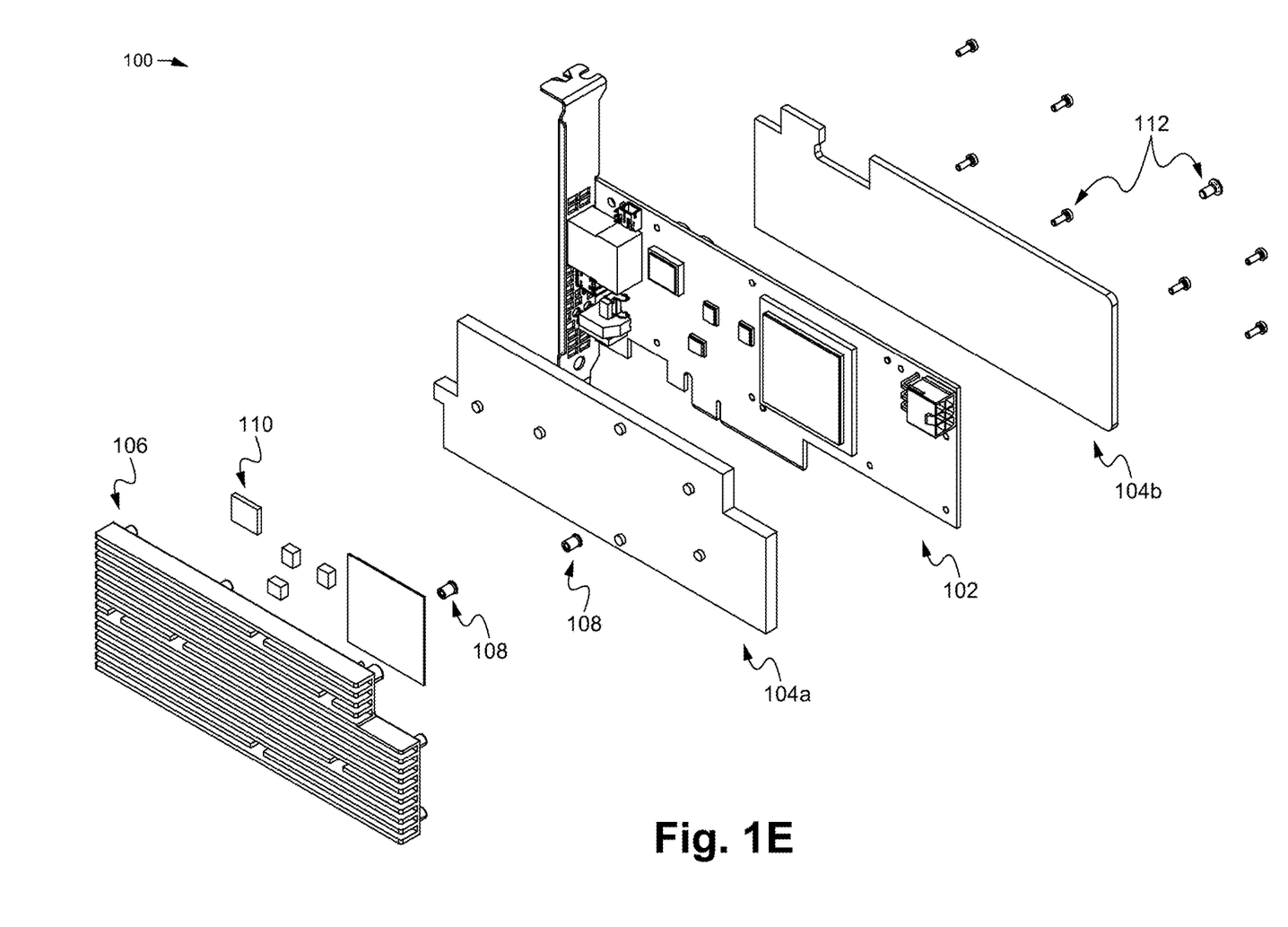
FIG. 1E illustrates an exploded top perspective view of a hardware security module system according to some embodiments.
Figure 2A:
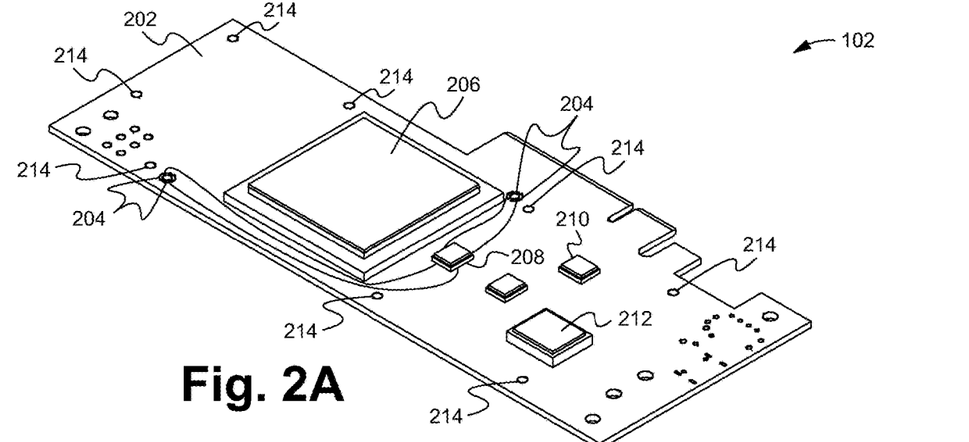
FIG. 2A illustrates a top perspective view of the printed circuit board according to some embodiments.
Figure 2B:
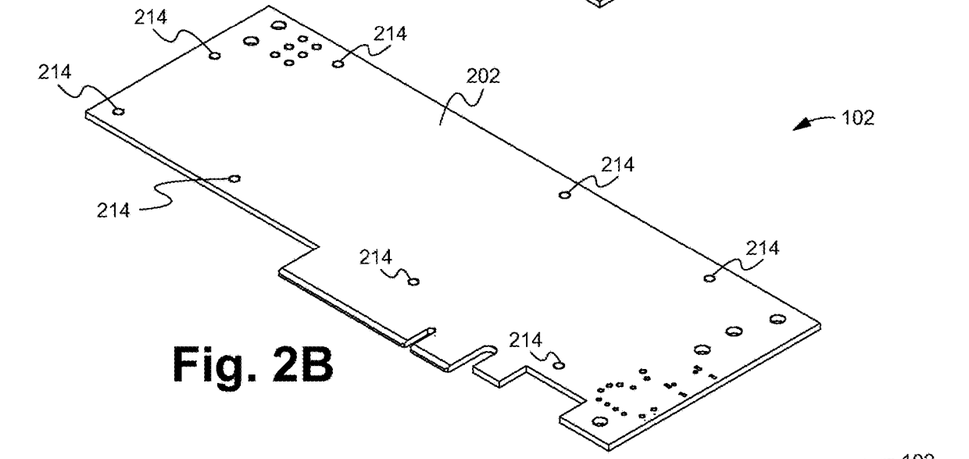
FIG. 2B illustrates a bottom perspective view of the printed circuit board according to some embodiments.
Figure 2C:
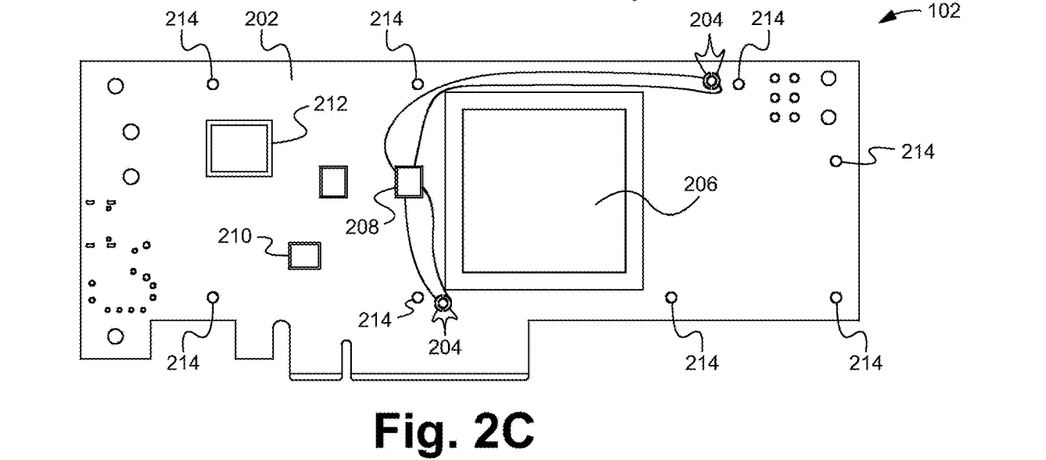
FIG. 2C illustrates a top view of the printed circuit board according to some embodiments.
Figure 3A:
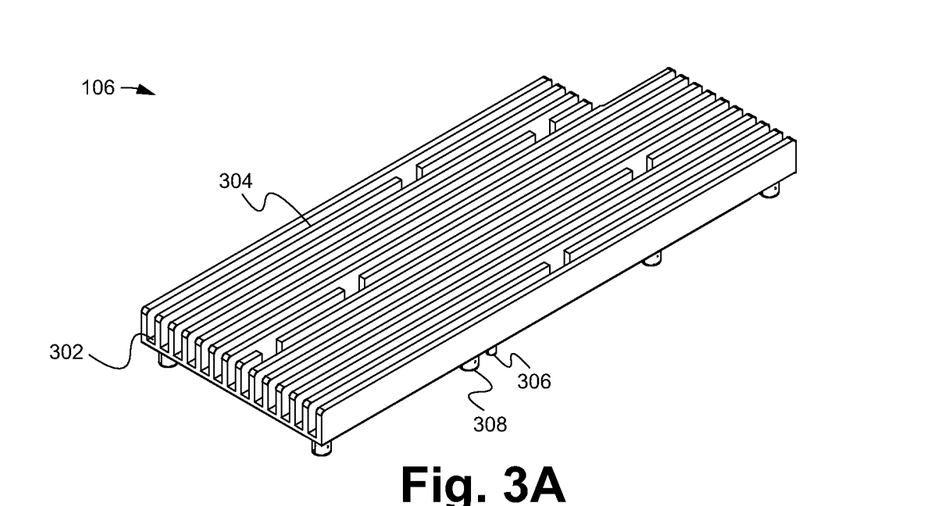
FIG. 3A illustrate a top perspective view of the heat sink cover according to some embodiments.
Figure 3B:
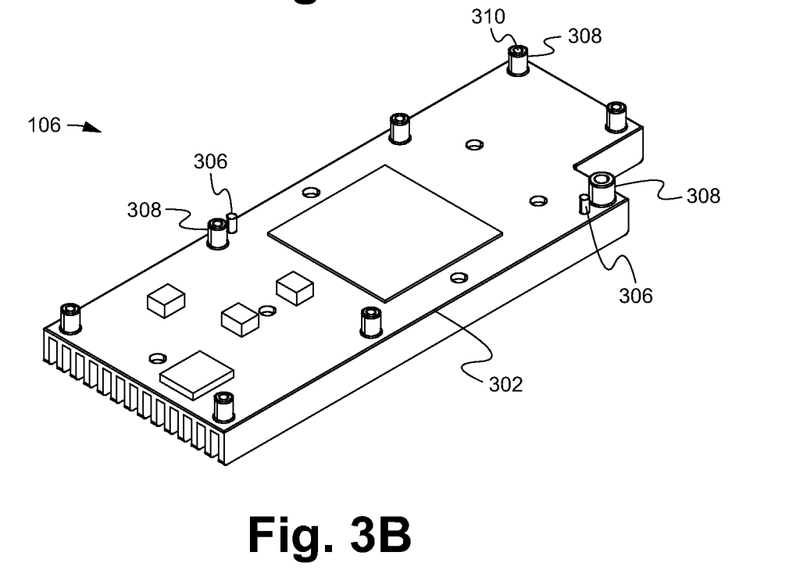
FIG. 3B illustrate a bottom perspective view of the heat sink cover according to some embodiments.
Figure 3C:
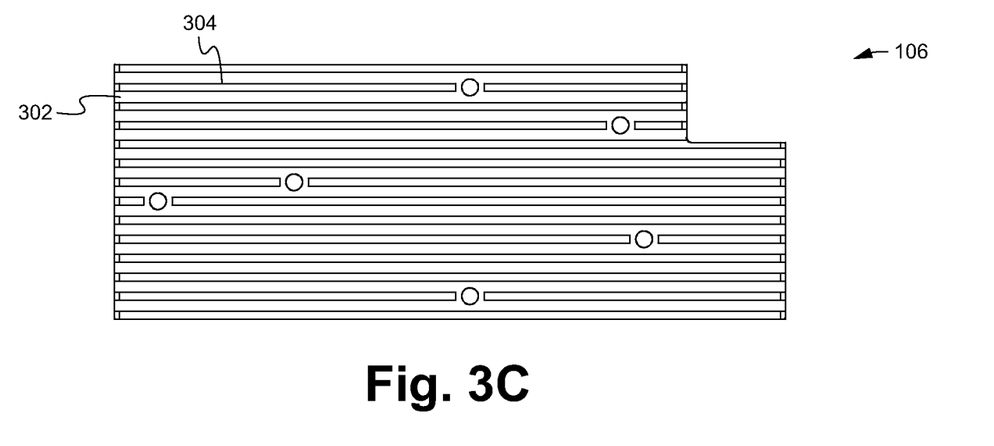
FIG. 3C illustrate a top view of the heat sink cover according to some embodiments.
Figure 3D:
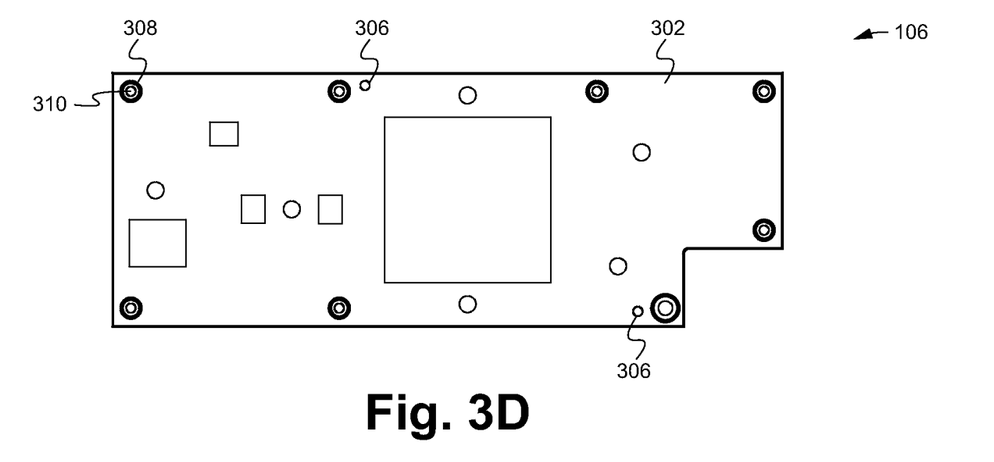
FIG. 3D illustrate a bottom view of the heat sink cover according to some embodiments.
Figure 3E:
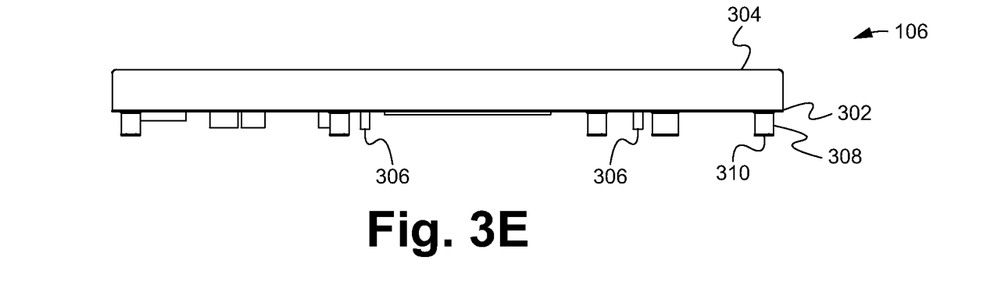
FIG. 3E illustrate a side view of the heat sink cover according to some embodiments.

FIGS. 2A-C illustrate a top perspective view, a bottom perspective view and a top view of the printed circuit board 102, respectively, according to some embodiments. As shown in FIGS. 2A-C, the printed circuit board 102 comprises a substrate 202 including a plurality of conductive contact pads 204, a central processing unit (CPU) 206, a security component 208, memory 210, an encryption/decryption component 212 and one or more fastener holes 214. The conductive contact pads 204, the central processing unit (CPU) 206, the security component 208, the memory 210 and/or the encryption/decryption component 212 are able to be electrically coupled together via one or more conductive traces/contact pads deposited on and/or through the substrate 202 thereby enabling the operation of the circuit 102 as described herein. In particular, the security component 208 is electrically coupled with both the conductive contact pads 204 and the encryption/decryption component 212 for monitoring signals transmitted and/or received through the security contact pads 204 and disabling/securing the encryption/decryption component 212 based on the received signals.

Although for the sake of clarity the security component 208 and the encryption/decryption component 212 are described herein and illustrated in FIGS. 2A-C as separate components, it is understood that the security component 208 and the encryption/decryption component 212 are able to be two functions/modules/elements of the same component that performs both of their functions. For example, a single microcontroller unit (MCU) or other computing unit of the circuit board 102 is able to include an encryption/decryption element (hardware and/or software) that performs the encryption/decryption functions described herein and a security element (hardware and/or software) that performs the security functions described herein.

In such embodiments, communications described herein between the security component 208 and the encryption/decryption component 212 are internal communications within the single component and communications described herein to/from the security component 208 and the encryption/decryption component 212 to/from other elements are communications to/from the single component to/from the other elements. Similarly, in such embodiments the electrical and/or physical coupling described herein between the security component 208 and the encryption/decryption component 212 are internal electrical and/or physical coupling within the single component and electrical and/or physical coupling described herein of the security component 208 and the encryption/decryption component 212 with other elements are electrical and/or physical coupling of the single component with the other elements.

The conductive contact pads 204 are able to be distributed on the top (or first) side of the substrate 202 in pairs (or groups of three or more) positioned at each location on the board 102 where one of the switches 108 contacts the board 102. Thus, the location of the pairs (or groups) mirror the location of the support posts 306 of the heat sink cover 106. In particular, the pairs (or groups) of contact pads 204 are able to be positioned next to each other, but not in direct electrical contact with each other, such that each of the conductive pucks 406 of the switches 108 is able to electrically couple one pair (or group) of contact pads 204 together. This electrical coupling forms a completed electrical path from one of the contact pads 204 of the set through the conductive puck 406 to another of the contact pads 204 of the set. Indeed, because each of the contact pads 204 is electrically coupled with the security component 208, the path is able to be from the security component 208 to one of the contact pads 204 to the conductive puck 406 to another of the contact pads 204 and back to the security component 208. As a result, the security component 208 is able to monitor whether the electrical paths are intact (e.g. electrical signals are being received from the path) or not intact (e.g. electrical signals are no longer being received from that path).

Figure 4A:
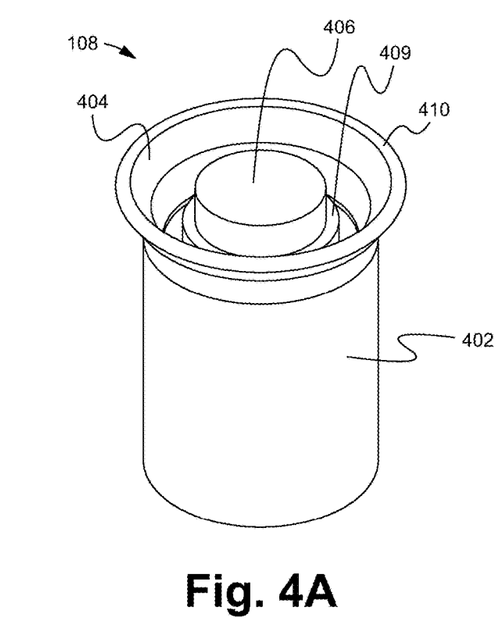
FIG. 4A illustrates a top perspective view of a tamper responsive switch according to some embodiments.
Figure 4B:
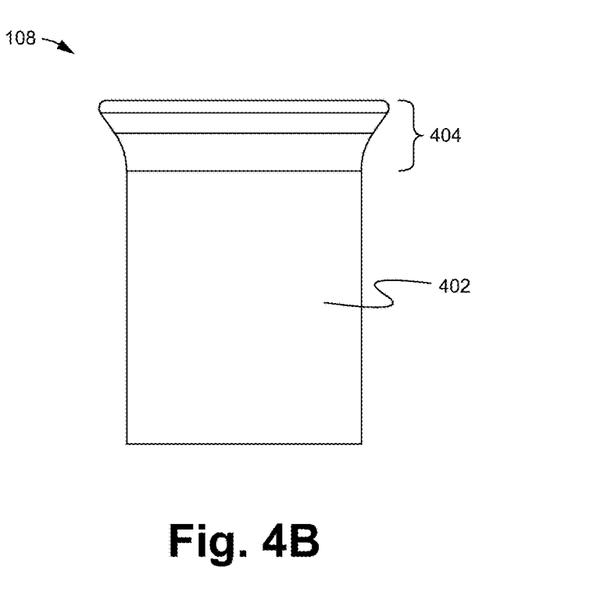
FIG. 4B illustrates a side view of a tamper responsive switch according to some embodiments.
Figure 4C:
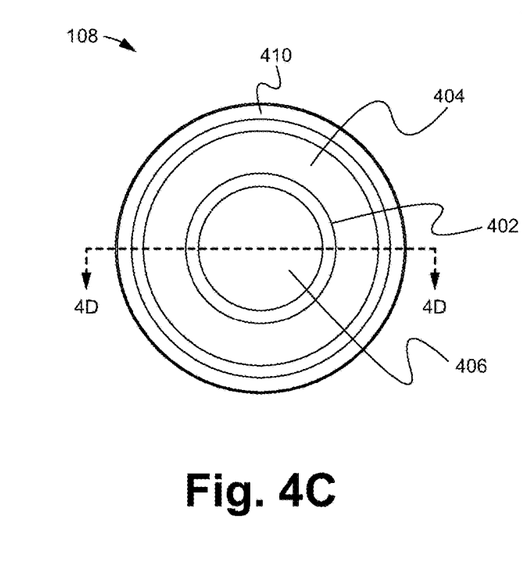
FIG. 4C illustrates a top view of a tamper responsive switch according to some embodiments.

In some embodiments, as shown in FIGS. 2A-2C, the pairs of contact pads 204 together form a discontinuous circle or oval structure (e.g. wherein an outer curve of the circle structure is congruent and/or aligns with the curve of the outer perimeter of the conductive puck 206 shown in FIG. 4C), wherein when pressed onto the pair, the conductive puck 406 provides an electrical bridge between the gaps of the circle or oval structure. Alternatively, the pairs of contact pads 204 (and/or the shape of the conductive puck 406) are able to have other structures as long as the conductive puck 406 is able to simultaneously contact both contact pads 204 of the pair when pressed against the printed circuit board 102. As shown in FIGS. 2A-2C, the board 102 comprises two pairs of contact pads 204. Alternatively, the substrate 202 is able to comprise more or less total contact pads 204 and/or more or less pairs (or larger size groups) of contact pads 204. The contact pads 204 are able to be gold contact pads or other types of conductive contact material. In some embodiments, each of the contact pads 204 is electrically isolated from each other of the contact pads 204 except for through one or more of the other components of the circuit board 102 such as the security component 208.

The encryption/decryption component 212 is able to be a computing component (hardware and/or software) that safeguards and manages cryptographic keys and provides cryptographic processing (e.g. using a cryptographic module). For example, the encryption/decryption component 212 is able to be a physical computing component that provides tamper-evident and intrusion-resistant safeguarding and management of digital keys and other secrets, as well as crypto-processing. Alternatively, the encryption/decryption component 212 is able to be other types of hardware security modules known in the art. As described above, the encryption/decryption component 212 is coupled with at least the CPU 206 and the security component 208 for providing encryption/decryption functions of the circuit board 102 including the storing, generating and/or maintaining of encryption keys.

The security component 208 is able to be a microcontroller or other type of hardware controller and/or a software controller. As described above, the security component 208 is operatively electrically coupled with at least the contact pads 204 of the board 102 and the encryption/decryption component 212 for transmitting signals through and detecting signals from the contact pads 204 (via the switches 108), and disabling access to, deleting and/or otherwise protecting the encryption data (e.g. encryption keys, data used to generate encryption keys, or other encryption data) stored in the encryption/decryption component 212 upon detection of decoupling or partial decoupling of one or more of the switches 108. The encryption/decryption component 212 and/or the security component 208 are able to operate in conjunction with and/or independently of the CPU 206 and/or the memory 210. In particular, although shown separately and in a single location in FIGS. 2A-2C, the memory 210 is able to be located in multiple locations, shared memory, dedicated memory and/or wholly or partially internal memory of the encryption/decryption component 212 and/or the controller 208.

In some embodiments, one or more of the components of the printed circuit board 102 are able to be combined in to a single component and/or divided into multiple components with the overall functionality of the printed circuit board 102 remaining the same. In some embodiments, the printed circuit board 102 is able to comprise one or more additional components such as, but not limited to, power sources, network interfaces, resistors, capacitors, inductors, transistors, physical ports and/or other components known in the art. Similarly, the substrate 202 is able to include a plurality of additional contact pads and/or conductive traces (not shown) for electrically coupling one or more of the embedded components, surface mounted components and/or other components of the printed circuit board 102 together to enable operation of the circuit. Alternatively, one or more of the components are able to be omitted. In some embodiments, the printed circuit board 102 is an LS2-B0 HSM adapter. Alternatively, the printed circuit board 102 is able to be other types of devices including an encryption/decryption component 212. In some embodiments, the holes 214 are able to align with the coupling pillars 308 such that the fasteners 112 are able to slide through the holes 214 and engage with (e.g. thread into) the coupling pillars 308 as they protrude out the other side of the holes 214.

FIGS. 3A-3E illustrate a top perspective view, a bottom perspective view, a top view, a bottom view and a side view of the heat sink cover 106, respectively, according to some embodiments. As shown in FIGS. 3A-3E, the heat sink cover 106 comprises a base or sheet 302, one or more cooling fins 304 extending from the base 302, one or more support posts 306 and one or more coupling pillars 308 each having a coupling shaft 310. Alternatively, one or more of the cooling fins 304, support posts 306 and/or coupling pillars 308 are able to be omitted. Further, although as shown in FIGS. 3A-3E, the heat sink cover 106 comprises eight coupling pillars 308 and two support posts 306, more or less coupling pillars 308 and/or support posts 306 are able to be used. The fins 304 facilitate the distribution and release of heat produced by the circuit board 102 (absorbed directly or via the thermal gap pads 110).

The support posts 306 are able to have a radius or size such that they are each able to slide into the support cavity 408 of one of the switches 108 thereby securing the switches 108 in that location on the heat sink cover 106. Further, the support posts 306 are able to have the same length as the depth of the support cavity 408 such that when fully slid within the support cavity 408, an end of the posts 306 contacts a bottom of the support cavity 408 and/or the perimeter of the switch 108 surrounding the opening leading into the support cavity 408 contacts the base 302 of the heat sink cover 106. Although as shown in FIGS. 3A-3E the support posts 306 (and the support cavity 408) have a generally solid cylindrical shape, it is understood that one or more of the support posts 306 (and/or support cavities 408) are able to have other non-cylindrical shapes (e.g. rectangular prism, triangular prism, n-sided prism and/or irregular shapes) as long as the posts 306 are able to securely fit within the support cavities 408 and ensure alignment of the switches 108.

In some embodiments, each of the support posts 306 is positioned adjacent to a different one of the coupling pillars 308. As a result, as described above, the strength of the force producing the compression, contact and/or electrical coupling between each of the tamper responsive switches 108 (when coupled to the posts 306) and the security contact pads 204 is able to be better controlled by tightening or loosening the engagement of the fastener 112 with the coupling pillar 308 adjacent to that switch 108. When positioned adjacent to coupling pillars 308, the coupling pillars 308 are able to protect the switches 108 and posts 306 from being over-compressed by providing rigid structure that resists further compression against the circuit board 102 once the pillars 308 contact the surface of the top of the printed circuit board 102. Alternatively, one or more of the support posts 306 are able to be positioned elsewhere on the heat sink cover 106 non-adjacent to one of the coupling pillars 308.

Figure 4D:
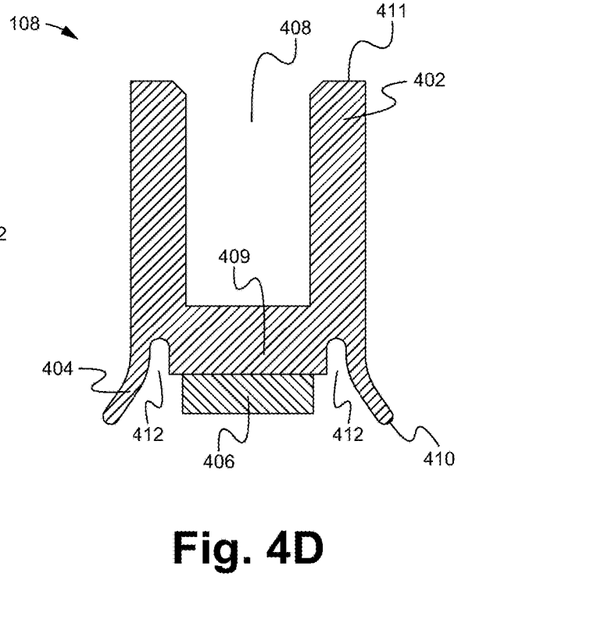
FIG. 4D illustrates a cross-sectional view of a tamper responsive switch at line 4D shown in FIG. 4C according to some embodiments.

In some embodiments, the coupling shafts 310 are threaded such that they are able to threadably couple with threads of the fasteners 112. Alternatively, the coupling shafts 310 are able to comprise other coupling features for coupling to the fasteners 112 as they extend through the holes 214 of the circuit board 102. The coupling pillars 308 are able to have a height that is less than a height of one or more of the switches 108. In some embodiments, the difference in height between the coupling pillars 308 and the switches 108 is able to be equal to or greater than a difference in height of the switches 108 with and without the flange 404 (e.g. a height distance between the end face of the conductive puck 406 and the outmost edge 410 of the flange 404 as illustrated in FIG. 4D). As a result, when being coupled to the circuit board 102, the switches 108 contact the top of the circuit board 102 before the coupling pillars 308 contact the top of the circuit board 102 such that as the coupling pillars 308 are further coupled to the circuit board 102 (until they contact the board 102), the posts 306 compress the switches 108 causing the contact between the conductive puck 406 and the security pads 204 at that location.

Although as shown in FIGS. 3A-3E the coupling pillars 308 have a generally hollow cylindrical shape, it is understood that one or more of the coupling pillars 308 are able to have other non-cylindrical hollow or solid shapes (e.g. rectangular prism, triangular prism, n-sided prism and/or irregular shapes) as long as the pillars 308 are able to securely couple with the fasteners 112. Correspondingly, although as shown in FIGS. 3A-3E the coupling shafts 310 have a generally hollow internally threaded cylindrical shape, it is understood that one or more of the coupling shafts 310 are able to have other threaded or non-threaded cylindrical or non-cylindrical shapes as long as the shaft 310 is able to receive and couple with the fasteners 112.

In some embodiments, the base 302, fins 304, the support posts 306 and/or the coupling pillars 308 are integrally formed as a single continuous piece. Alternatively, one or more of the fins 304, the support posts 306 and/or the coupling pillars 308 are able to be physically attached to the base 302 (e.g. via press fitting, snap fit, threaded connection, or other methods of physical attachment). The heat sink cover 106 is able to be rigid in order to provide physical protection to the circuit board 102. In some embodiments, the heat sink cover 106 is able to be formed by metal. Alternatively, the cover 106a is able to be formed by one or a combination of materials such as metals, plastics, or other materials. Thus, the heat sink cover 106 provides the advantage of both distributing heat produced by the circuit board 102 while also ensuring alignment and coupling of the switches 108 with the security contact pads 204.

FIGS. 4A-4D illustrate top perspective, side, top and cross-sectional views, respectively, of an exemplary tamper responsive switch 108 according to some embodiments. In particular, FIG. 4D illustrates a cross-sectional view of the tamper responsive switch 108 at the line 4D shown in FIG. 4C according to some embodiments. As shown in FIGS. 4A-4D, the switch 108 comprises a body 402 having a support cavity 408 at a bottom end and a pedestal 409 at a top end, a flange 404 extending from a perimeter of the top end of the body 204 and a conductive puck 406 extending from the pedestal 409 at the top of the body 402 within a flange chamber 412 formed by the flange 404. The body 402 and/or the flange 404 are able to be made of non-electrically conductive elastic materials such that they are able to flex when compressed. In some embodiments, the body 402 and/or the flange 404 are made of non-electrically conductive rubber, silicone, other elastic materials and/or a combination thereof. The conductive puck 406 is able to be made of an electrically conductive material or combination of materials. For example, the conductive puck 406 is able to be made of an electrically conductive rubber. As a result, the puck 406 is able to both conduct electricity and to flex and/or elastically spring back when subjected to compression forces. Alternatively, the conductive puck 406 is able to be made of other electrically conductive materials or a combination thereof and/or be rigid/non-elastic.

The width, shape and depth of support shaft 408 is able to match the width, shape and length of the support posts 306 such that the support posts 306 are able to fully slide within the support shafts 406 of the switches 108. As shown in FIGS. 4A and 4C, the conductive puck 406 is able to have a cylindrical shape with a circular outermost surface that is able to contact a plurality of the security contact pads 204 simultaneously. In particular, the shape and size of the outermost surface of the puck 406 is able to align and/or be congruent with the shape/perimeter of the pairs (or more) of security contact pads 204 in each location on the board 102. Alternatively, the shape and size of the puck 406 (e.g. including the outermost surface of the puck 406) is able to be non-cylindrical and/or non-circular as long as the outermost surface is still able to electrically and/or physically contact a plurality of the security contact pads 204 at the location of the switch 108.

As shown in FIG. 4D, a length of the switch 108 from the bottom end 411 to the outermost edge 410 of the flange 404 is greater than a length of the switch 108 from the bottom end to the outermost face of the conductive puck 406. As a result, when compressed against the printed circuit board 102, the outermost edge 410 of the flange 404 is the first to contact the board 102 (with the outermost face of the puck 406 yet to contact the surface of the board 102/security pads 204). Then as the switch 108 is further compressed against the board 102, the flange 404 bends/flexes enabling the outermost face of the puck 406 to contact (and electrically couple with) a plurality of the security pads 204 on the surface of the board 102. At the same time, the flange provides a potting-tight seal around the flange chamber 412 due to the edge 410 of the flange 404 pressing against the circuit board 102 in a perimeter around the puck 406 (which prevents the upper potting 104a and attackers from contacting/accessing the puck 406). Indeed, as shown in FIG. 4D, the conductive puck 406 and/or the pedestal 409 are positioned fully within the flange chamber 412 when the flange 404 is not being flexed and remains protected within the chamber 412 when the flange 404 is fully flexed against the board 102. Due to the flex/bend of the flange 404, when the compression force is released (e.g. due to an attacker removing the heat sink cover 106 and/or otherwise attempting to access the encryption/decryption component 212), the flange 404 springs back into its fully extended position thereby pulling the puck 406 away from the surface of the board 102 (such that the security component 208 is able to detect the attack).

As a result, flange 404 provides the advantage of both protecting the conductive puck 406 from the upper potting 104a and/or other outside access when compressed against the board 102 as well as ensuring disconnection of the puck 406 from the security contact pads 204 when an attack takes place. Alternatively, the flange 404 is able to be shorter such that its outermost edge 410 aligns with the outermost edge of the puck 406. In such embodiments, the flange 404 would not cause the puck 406 to pull away from the board 102, but would still provide the protective flange chamber 412.

In operation, the security component 208 sends and monitors periodic or continuous electrical signals transmitted through electrical paths (described above) formed by the security component 208, the security contact pads 204 and the conductive puck 406 (and the board traces electrically coupling the security component 208 and the pads 204). In particular, as described above, the security contact pads 204 are electrically couped with the security component 208, but not to each other except when the switch 108 contacts the board 102 and thereby provides an electrical bridge from one of the security contact pads 204 at a location to at least one other security contact pad 204 at the location forming the electrical paths. Each of these electrical paths serially electrically couple the security component 208 (e.g. via board 102 traces coupled thereto) to one of the security contact pads 204, through the conductive puck 406 to another of the security contact pads 204 and then back to the security component 208 (e.g. forming an electrical loop. In some embodiments the security component 208 sends separate signals through each of the different loops. Alternatively, two or more of the electrical loops/paths are able to share a signal.

As a result of these connections, the security component 208 is able to transmit electrical signals through the electrical paths and receive the signals back as they complete their electrical loop. If the security component 208 determines that there has been an attempted intrusion (e.g. based on a deviation of the received signals from their normal parameters, for example, voltage, amperage or other parameter of the signal falling outside a predefined range) the security component 208 is able to send a signal to the encryption/decryption component 212 and/or other components (e.g. the CPU 206) to shut down, secure, delete or otherwise protect the data (e.g. encryption keys, key generation data) within the encryption/decryption component 212 and/or other components. Indeed, these serial paths/connections provides the advantage of guarding against easy removal/lifting of the heat sink cover 106 and/or switches 108 as the lifting breaks the electrical connection of one or more of the paths by separating the switch 108 from the contact pads 204.

Figure 5:
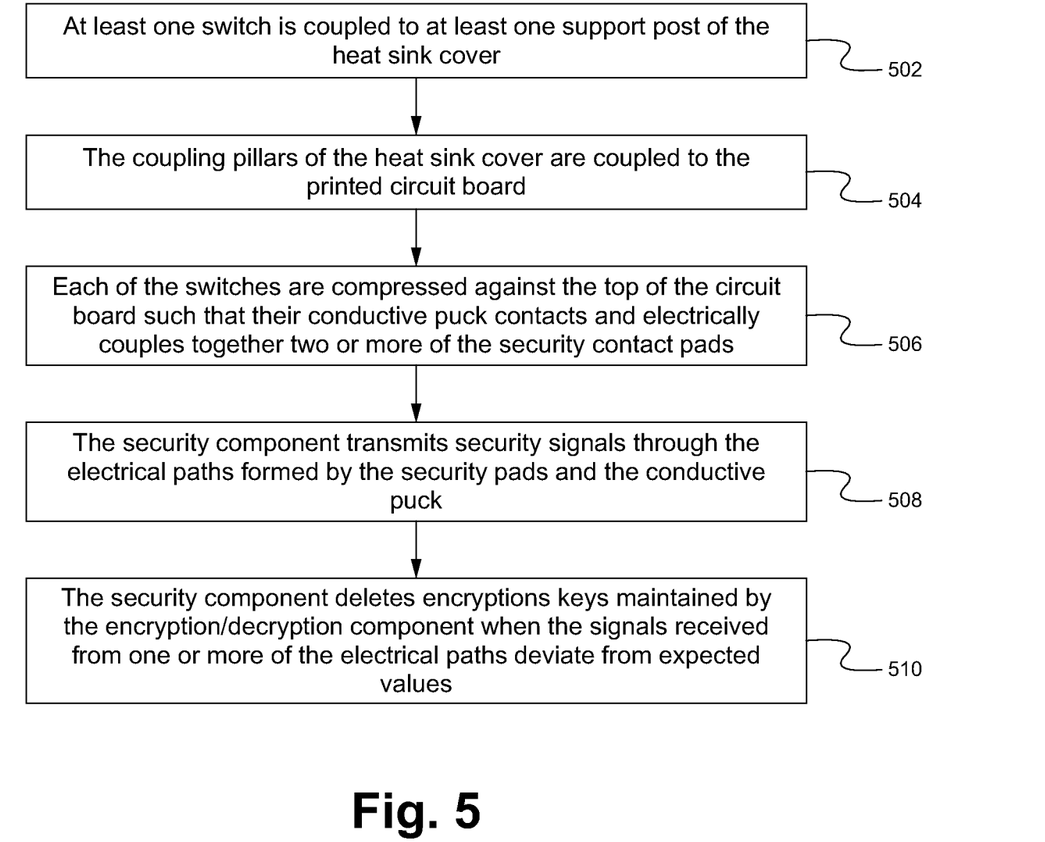
FIG. 5 illustrates a method of implementing payment card industry compliant hardware security module system according to some embodiments.

FIG. 5 illustrates a method of implementing payment card industry compliant hardware security module system 100 according to some embodiments. As shown in FIG. 5, at least one switch 108 is coupled to at least one support post 306 of the heat sink cover 106 at the step 502. In some embodiments, the coupling comprises the support post 306 being slide into the support cavity 408 of the switch 108. The coupling pillars 308 of the heat sink cover 106 are coupled to the printed circuit board 102 at the step 504. In some embodiments, the coupling comprises the fasteners 112 being extended through the holes 214 of the circuit board 102 and engaging with the coupling shafts 310 of the coupling pillars 308. Each of the switches 108 are compressed against the top of the circuit board 102 such that their conductive puck 406 contacts and electrically couples together two or more of the security contact pads 204 at the step 506. The security component 208 transmits security signals through the electrical paths formed by the security pads 204 and the conductive puck 406 at the step 508. The security component 208 deletes, alters and/or otherwise protects encryptions keys (and/or other encryption data) maintained by the encryption/decryption component 212 when the signals received from one or more of the electrical paths deviate from expected values at the step 510. As a result, the method provides the advantage of providing protection for the encryption/decryption component 212 preventing accessing of the printed circuit board 102 without alerting the security component 208. Alternatively, one or more of the steps are able to be omitted and/or other steps added.

In some embodiments, the method further comprises depositing upper potting 104a between the heat sink cover 106 and the printed circuit board 102 thereby encasing the encryption/decryption component 212, the security component 208, the security contact pads 204, the CPU 206 and/or the switches 108. In some embodiments, the method further comprises depositing lower potting 104b on the bottom of the printed circuit board 102 covering the tops of the fasteners 112. In some embodiments, depositing the upper and/or lower potting 104a, 104b is able to comprise surrounding the heat sink cover 106, printed circuit board 102, thermal gap pads 110 and fasteners 112 (all coupled together as described herein) with a potting mold(s) (not shown) and filling the potting mold with the potting (in its non-hardened form) such that it fills the area between the heat sink cover 106 and the printed circuit board 102 and below the printed circuit board 102. The deposited potting is then able to be cured such that it hardens in place and the mold(s) is able to be removed. As a result, the method provides the advantage of preventing access to the fasteners 112, the switches 108 and/or the components of the printed circuit board 102 by protecting them with potting 104a, 104b.

The hardware security module system, method and device described herein provides numerous advantages. Specifically, the system, method and device provide the advantage of preventing an attacker from accessing encryption data by physically accessing the encryption/decryption component 212. In particular, if an attacker were trying to unscrew or otherwise lift the heat sink 106 and/or switches 108 in order to access the components of the circuit board assembly 102, the switches 108 would spring away from the security contact pads 204 (e.g. upon release of the pressure coupling the switch to the contact pads 204 provided by the heat sink 106) thereby alerting the security component 208 of the intrusion (where the security signal is lost and the encryption data is able to be zeroized before it can be accessed). Further, the system, method and device provides the advantage of providing a protective flange 404 that both protects the capacitive puck 404 from being contacted by the upper potting 104a as well as facilitating the springing disconnection of the puck 404 from the security contact pads 204 when the heat sink 106 is lifted and/or the force pushing the switches 108 against the security contact pads 204 is otherwise removed. Moreover, the system, method and device provide the advantage of enabling the strength of the force producing the compression, contact and/or electrical coupling between each of the tamper responsive switches 108 and the security contact pads 204 to be better controlled by tightening or loosening the engagement of the fastener 112 with the coupling pillar 308 adjacent to that switch 108. Further, by having switches 108 positioned adjacent to coupling pillars 308, the system, method and device provide the advantage of enabling the coupling pillars 308 to protect the switches 108 from being over-compressed by providing rigid structure that resists further compression against the circuit board 102 once the pillars 308 contact the surface of the top of the printed circuit board 102.

While the system, method and device has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details. In particular, it should be noted that although not described in detail for the sake of brevity, the components of the printed circuit board 102 are able to include one or more of a network interface, a memory, a processor, I/O device(s), a bus and a storage device. The memory is able to be any conventional computer memory known in the art. The storage device is able to include a hard drive, RAM, SRAM, CDROM, CDRW, DVD, DVDRW, flash memory card or any other storage device. An example of a network interface includes a network card connected to an Ethernet or other type of LAN. The I/O device(s) are able to include one or more of the following: keyboard, mouse, monitor, display, printer, modem, touchscreen, button interface and other devices. The operating system(s), graphical user interface(s), application(s), module(s) and/or other software used to operate the printed circuit board 102 are likely to be stored in the memory and/or storage device and processed as applications are typically processed via the processor.

We claim:

1. A hardware security module system, the system comprising:
   a printed circuit board assembly including a printed circuit board, a memory storing encryption/decryption software for encrypting/decrypting data, a security component, at least one pair of security contact pads and a central processing unit (CPU), wherein the memory, the security component, the at least one pair of security contact pads and the CPU are all positioned on a first board side of the printed circuit board, and the security component is electrically coupled with the at least one pair of security contact pads;
   a rigid heat sink cover having a heat sink body, a plurality of heat dissipating fins, a plurality of coupling members and at least one support member, the plurality of heat dissipating fins extending from a first cover side of the heat sink body and the coupling members and the at least one support member extending from a second cover side of the heat sink body opposite the first cover side, wherein the coupling members are coupled to the first board side of the printed circuit board; and
   at least one switch including a non-electrically conductive body having a support cavity accessible from a first end of the non-electrically conductive body, a conductive puck extending from a second end of the non-electrically conductive body opposite the first end and a protective flange extending from the second end and surrounding a perimeter of the conductive puck;
   wherein the at least one support member is positioned within the support cavity of the at least one switch such that the at least one switch is compressed between the second cover side of the heat sink body and the at least one pair of security contact pads on the first board side of the printed circuit board and the conductive puck is pressed against the at least one pair of security contact pads thereby electrically coupling the at least one pair of security contact pads together.

2. The system of claim 1, wherein a length of the at least one switch the from the first end to an outermost edge of the flange is greater than a length of the support pillars.

3. The system of claim 2, wherein the flange forms a chamber surrounding the conductive puck.

4. The system of claim 3, further comprising upper potting positioned between the second cover side and the top of the printed circuit board thereby encasing the memory, the security component, the at least one pair of security contact pads and the CPU.

5. The system of claim 4, wherein the flange forms a seal with the top of the printed circuit board thereby keeping the upper potting out of the chamber such that the upper potting does not contact the conductive puck.

6. The system of claim 5, wherein the security component transmits electrical signals through and receives return electric signals from the conductive puck via the at least one pair of security contact pads.

7. The system of claim 6, wherein the security component deletes encryption keys maintained by the encryption/decryption software when the return electrical signals deviate from predetermined values.

8. The system of claim 7, wherein the at least one support member is positioned adjacent to one of the coupling members.

9. The system of claim 8, wherein the at least one switch is elastic such that the at least one switch is able to be compressed between the heat dissipating plate and the printed circuit board without breaking.

10. The system of claim 9, wherein the conductive puck is made of conductive rubber and the non-electrically conductive body is made of silicone.

11. The system of claim 10, wherein the printed circuit board further comprises a microcontroller unit (MCU) and both the security component and the encryption/decryption software are a part of the MCU.

12. A method of implementing a hardware security module system, the method comprising:
   providing a printed circuit board assembly including a printed circuit board, a memory storing encryption/decryption software for encrypting/decrypting data, a security component, at least one pair of security contact pads and a central processing unit (CPU), wherein the memory, the security component, the at least one pair of security contact pads and the CPU are all positioned on a first board side of the printed circuit board, and the security component is electrically coupled with the at least one pair of security contact pads;
   coupling at least one switch to at least one support member of a rigid heat sink cover by sliding the at least one support member into a support cavity of the switch, the rigid heat sink cover having a heat sink body, a plurality of heat dissipating fins, a plurality of coupling members and the at least one support member, the plurality of heat dissipating fins extending from a first cover side of the heat sink body and the coupling members and the at least one support member extending from a second cover side of the heat sink body opposite the first cover side, wherein the at least one switch includes a non-electrically conductive body having the support cavity accessible from a first end of the non-electrically conductive body, a conductive puck extending from a second end of the non-electrically conductive body opposite the first end and a protective flange extending from the second end and surrounding a perimeter of the conductive puck; and
   coupling the coupling members of the rigid heat sink cover to the first board side of the printed circuit board such that the at least one switch is compressed between the second cover side of the heat sink body and the at least one pair of security contact pads on the first board side of the printed circuit board and the conductive puck is pressed against the at least one pair of security contact pads thereby electrically coupling the at least one pair of security contact pads together.

13. The method of claim 12, wherein a length of the at least one switch the from the first end to an outermost edge of the flange is greater than a length of the support pillars.

14. The method of claim 13, wherein the flange forms a chamber surrounding the conductive puck.

15. The method of claim 14, further comprising depositing upper potting between the second cover side and the top of the printed circuit board thereby encasing the memory, the security component, the at least one pair of security contact pads and the CPU.

16. The method of claim 15, wherein the flange forms a seal with the top of the printed circuit board thereby keeping the upper potting out of the chamber such that the upper potting does not contact the conductive puck.

17. The method of claim 16, further comprising, with the security component, transmitting electrical signals through and receiving return electric signals from the conductive puck via the at least one pair of security contact pads.

18. The method of claim 17, further comprising, with the security component, deleting encryption keys maintained by the encryption/decryption software when the return electrical signals deviate from predetermined values.

19. The method of claim 18, wherein the at least one support member is positioned adjacent to one of the coupling members.

20. The method of claim 19, wherein the at least one switch is elastic such that the at least one switch is able to be compressed between the heat dissipating plate and the printed circuit board without breaking.

21. The method of claim 20, wherein the conductive puck is made of conductive rubber and the non-electrically conductive body is made of silicone.

22. The method of claim 21, wherein the printed circuit board further comprises a microcontroller unit (MCU) and both the security component and the encryption/decryption software are a part of the MCU.

23. A hardware security module adapter, the adapter comprising:
a printed circuit board including a memory storing encryption/decryption software for encrypting/decrypting data, a security component, at least one pair of security contact pads and a central processing unit (CPU), wherein the memory, the security component, the at least one pair of security contact pads and the CPU are all positioned on a first board side of the printed circuit board, and the security component is electrically coupled with the at least one pair of security contact pads; and
at least one switch including a non-electrically conductive body having a support cavity accessible from a first end of the non-electrically conductive body, a conductive puck extending from a second end of the non-electrically conductive body opposite the first end and a protective flange extending from the second end and surrounding a perimeter of the conductive puck;
wherein the at least one switch is compressed against the at least one pair of security contact pads on the first board side of the printed circuit board thereby electrically coupling the at least one pair of security contact pads together.

24. The adapter of claim 23, wherein the flange forms a chamber surrounding the conductive puck.

25. The adapter of claim 24, further comprising upper potting positioned on the top of the printed circuit board thereby encasing the memory, the security component, the at least one pair of security contact pads and the CPU.

26. The adapter of claim 25, wherein the flange forms a seal with the top of the printed circuit board thereby keeping the upper potting out of the chamber such that the upper potting does not contact the conductive puck.

27. The adapter of claim 26, wherein the security component transmits electrical signals through and receives return electric signals from the conductive puck via the at least one pair of security contact pads.

28. The adapter of claim 27, wherein the security component deletes encryption keys maintained by the encryption/decryption software when the return electrical signals deviate from predetermined values.

29. The adapter of claim 28, wherein the at least one switch is elastic such that the at least one switch is able to be compressed against the printed circuit board without breaking.

30. The adapter of claim 29, wherein the conductive puck is made of conductive rubber and the non-electrically conductive body is made of silicone.

31. The adapter of claim 30, wherein the printed circuit board further comprises a microcontroller unit (MCU) and both the security component and the encryption/decryption software are a part of the MCU.

32. A security module system, the system comprising:
a printed circuit board assembly including a printed circuit board and means for encrypting/decrypting data, means for securing the means for encrypting/decrypting data, means for processing data and means for electrically coupling with the means for securing, wherein the means for encrypting/decrypting data, the means for securing, the means for processing data and the means for electrically coupling are all positioned on a first board side of the printed circuit board, and the means for securing electrically is coupled with the means for electrically coupling;
a rigid heat sink cover having a heat sink body, means for dissipating heat, means for coupling to the printed circuit board and means for supporting a switch, the means for dissipating heat extending from a first cover side of the heat sink body and the means for coupling and the means for supporting extending from a second cover side of the heat sink body opposite the first cover side, wherein the means for coupling are coupled to the first board side of the printed circuit board; and
at least one switch including a non-electrically conductive body having a support cavity accessible from a first end of the non-electrically conductive body, means for completing an electrical circuit extending from a second end of the non-electrically conductive body opposite the first end and means for protecting the means for completing extending from the second end and surrounding a perimeter of the means for completing;
wherein the means for supporting is positioned within the support cavity of the at least one switch such that the at least one switch is compressed between the second cover side of the heat sink body and the means for electrically coupling on the first board side of the printed circuit board and the means for completing is pressed against the means for electrically coupling thereby electrically coupling the means for electrically coupling together.

\* \* \* \* \*